J. H. DOUGLASS.
RESILIENT TIRE.
APPLICATION FILED OCT. 27, 1917.
1,332,816.
Patented Mar. 2, 1920.
2 SHEETS—SHEET 1.
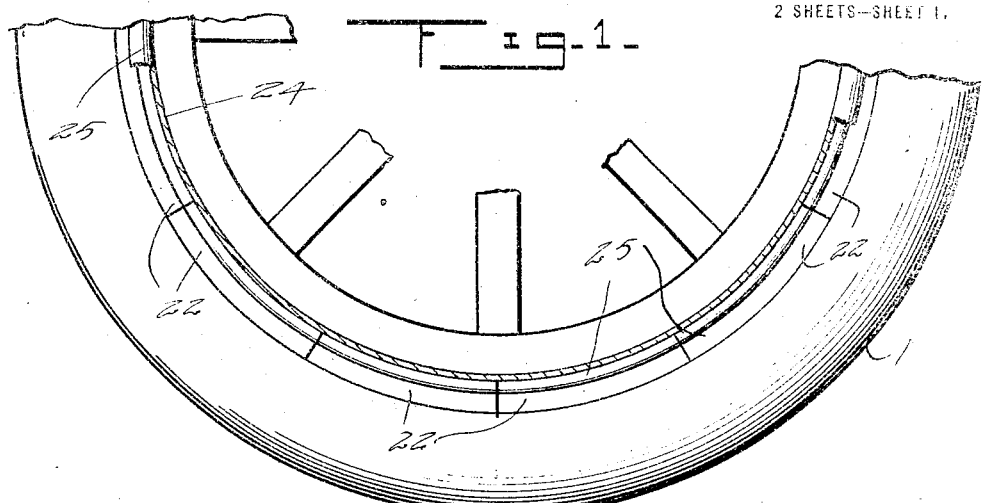
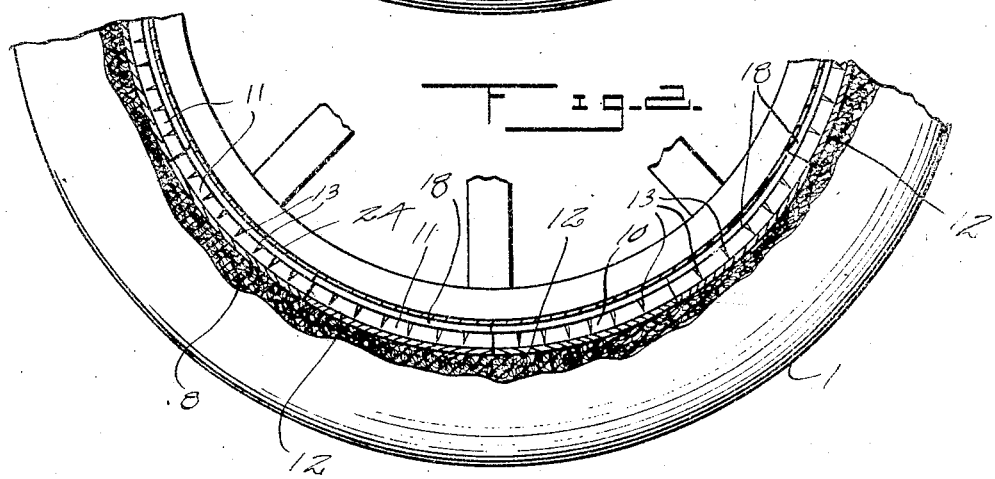
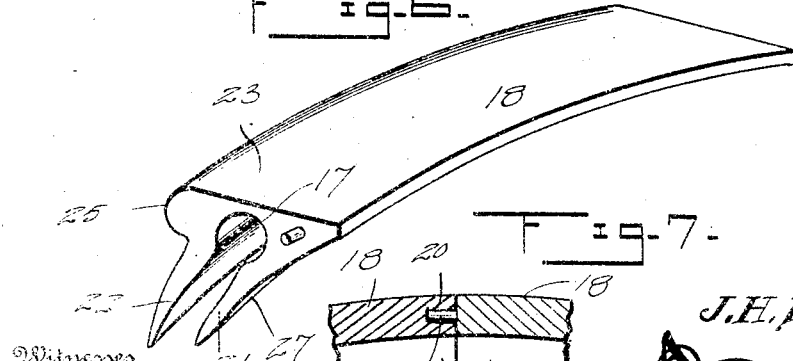
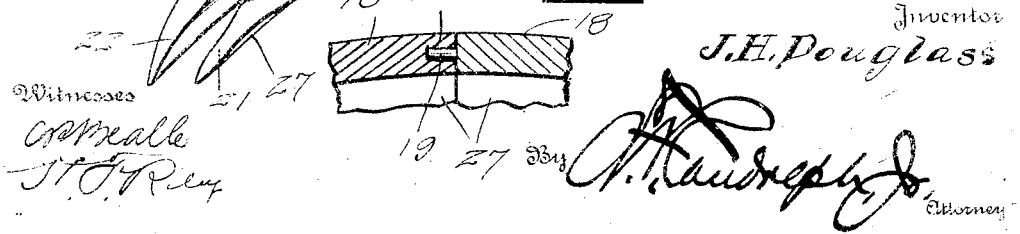
Inventor
J. H. Douglass

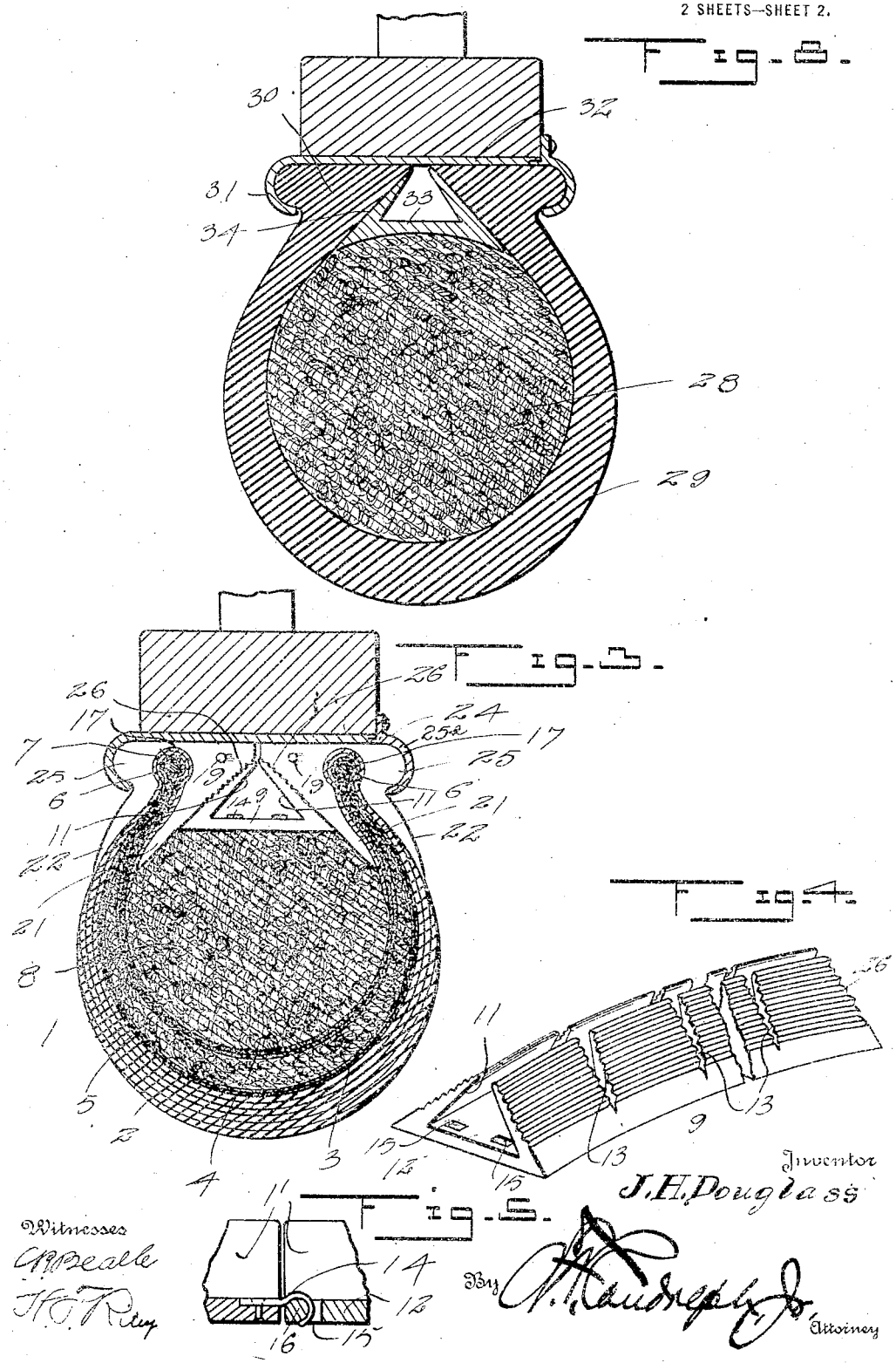

UNITED STATES PATENT OFFICE.

JAMES H. DOUGLASS, OF NORFIELD, MISSISSIPPI.

RESILIENT TIRE.

1,332,816.

Specification of Letters Patent. Patented Mar. 2, 1920.

Application filed October 27, 1917. Serial No. 198,846.

*To all whom it may concern:*

Be it known that I, JAMES H. DOUGLASS, a citizen of the United States, residing at Norfield, in the county of Lincoln and State of Mississippi, have invented certain new and useful Improvements in Resilient Tires; and I do hereby declare the following to be a full, clear, and exact description of the invention, such as will enable others skilled in the art to which it appertains to make and use the same.

The invention relates to a resilient tire.

The object of the present invention is to improve the construction of resilient tires and to provide a simple, practical and efficient resilient tire of strong, durable and comparatively inexpensive construction designed for use on automobiles and motor trucks and various other vehicles and adapted to dispense with pneumatic tires and eliminate tire troubles and capable of affording the desired resiliency in cushioning action.

With these and other objects in view, the invention consists in the construction and novel combination of parts hereinafter fully described, illustrated in the accompanying drawings and pointed out in the claims hereto appended; it being understood that various changes in the form, proportion, size and minor details of construction, within the scope of the claims, may be resorted to without departing from the spirit or sacrificing any of the advantages of the invention.

In the drawings:

Figure 1 is a side elevation of a portion of a wheel provided with a resilient tire constructed in accordance with this invention.

Fig. 2 is a longitudinal sectional view partly in elevation of the resilient tire and a portion of the wheel.

Fig. 3 is a transverse sectional view of the tire on an enlarged scale.

Fig. 4 is a detail perspective view of one of the sections of the central locking ring or member.

Fig. 5 is a detail sectional view illustrating one means of connecting the sections of the central locking ring or member.

Fig. 6 is a detail perspective view of one of the sections of the side clamping rings or members.

Fig. 7 is a detail sectional view illustrating one means for interlocking the sections of the side clamping rings or members.

Fig. 8 is a transverse sectional view illustrating the manner of applying the resilient cushioning body or filling to an ordinary outer tube or shoe of the clencher type.

Like numerals of reference designate corresponding parts in all the figures of the drawings.

In the accompanying drawings, in which is illustrated the preferred embodiment of the invention, 1 designates an outer tube or shoe comprising an outer section 2 made up of a plurality of layers of fabric and adhesive material such as rubber, tar or similar material adapted to act as a binder for the layers of fabric which may be vulcanized or not as desired and which forms a flexible outer section or covering for the outer shoe.

The outer shoe is also provided with a plurality of layers 3 and 4 of wire gauze arranged to form an inner lining for the section 2 and also a wall arranged in spaced relation with the inner lining and adapted to receive a resilient inner section 5 of elastic material. The wire gauze layers 3 constitute the lining and the other layers 4 of wire gauze form the said inner wall and are spaced from the said layers 3 as clearly shown in Fig. 3 of the drawings. The layers of wire gauze are arranged around circumferentially disposed wires or rods 6 and the material forms beads 7 at the base to produce an outer tube or shoe, and the outer section 2, which is tapered in thickness as shown, is preferably brought around the beads to cover the same.

The shoe 1 is filled with an elastic body 8 of plant pith such as cornstalk pith broken and ground to the required condition for compression and treated chemically to render the same waterproof and fireproof if desired and also to increase its elasticity or resiliency when deemed advisable while preserving the volume while in use. The body or filler is noiseless, yieldable and highly elastic and it is adapted to be forced into the tire under the required compression to form the body or filler and to expand the outer shoe to the desired degree. This material constitutes the elastic layer 5 and the material of the layer may be compressed between the layers of woven wire to any desired degree. The filler is introduced into the tire between the beads 7, which are maintained open by the filling mechanism and which are permitted to close upon a central annular locking member or ring 9, constructed of metal, wood or any other suitable material. The annular locking member or ring 9 is composed of arcuate sections 10 tapered or wedge shaped in cross section and preferably consisting of resilient inclined or angularly related sides or flanges 11 and a connecting web or portion 12 which presents a smooth face to the filler. The side flanges have their circumferential edges arranged in spaced relation before the locking ring or member is introduced into the tire and they are provided at intervals with transverse slots or openings 13 extending from the said circumferential edges of the side flanges and adapted to increase the resiliency of the sections and at the same time take care of the expansion and contraction by permitting the side flanges to move inwardly and outwardly. These sections, which form springs, may be connected together by any suitable means preferably by catches which, as illustrated in Fig. 5 of the drawings, may be in the form of hooks 14 for engaging in openings 15 of the engaged sections, the engaged portions 16 being preferably rounded as shown. Any other suitable form of catch, however, may be employed as the construction shown in Fig. 5 is simply for the purpose of illustrating one means of connecting the arcuate sections to form a complete annular member or ring.

The head portions of the shoe are arranged in slots or openings 17 of sections 18 of side clamping rings or members composed of arcuate sections preferably interlocked by dowel pins 19 and sockets 20 to form a continuous annular member or ring. The sections 18 are composed of inner and outer flanges 21 and 22 and a base or connecting portion 23 which presents a smooth surface to a rim 24. The side clamping rings or members are provided with ribs or beads 25 at the outer side to fit the flanges 26 of the rim 24. Any suitable flange may of course be employed having provision for enabling the parts to be assembled and demounted.

The inner faces of the flanges 21 and 22 conform to the configuration of the side portions of the shoe 1 and are adapted to close upon the same as shown in Fig. 3 to clamp the bead portions of the said shoe securely within the clamping rings or members which are interlocked with the rim. When the parts are disconnected from the rim, the flanges may be readily spread to permit the removal of the tire, the clamping rings being sufficiently yieldable to permit this action in both clamping and releasing the shoe. When the parts are assembled the pressure upon the tire will be transmitted to the wedge shaped central locking ring or member which will engage or bear against the inner flanges 21 and the latter present inclined or angularly disposed faces to the outer faces of the side flanges of the central locking ring or member. The locking member and the clamping members are provided with interfitting corrugations 26 and 27 formed on the engaging faces of the members. The inward pressure exerted by the filler upon the locking member and the interfitting corrugations hold the locking member in such position with relation to the clamping members as to hold the beads 25 of the clamping members in effective engagement with the flanges 25ª of the rim 24.

The elastic filler or body may, as shown at 28 in Fig. 8 of the drawings, be applied to an ordinary outer shoe 29 of the clencher type, the base or bead portions 30 being maintained in engagement with the side flanges 31 of a rim 32 by a locking ring or member 33 constructed the same as the locking member heretofore described with the exception that the side flanges are provided with smooth outer faces 34 to fit against the base portions of the shoe 29 for spreading the latter without wearing the same. The pressure on the locking ring or member will maintain the outer shoe in its interlocked relation with the rim and the greater the pressure to which the tire is subjected, the greater will be the interlocking action in both forms of the invention.

The elastic filler may be advantageously employed for pillows, mattresses and various forms of cushions where either air or an elastic filler such as hair or the like is ordinarily employed, and such material will be introduced into the covering of the mattress, pillow or cushion in a manner similar to introducing the material into a tire. The elastic filler is introduced into a tire or other covering in a dry state so as to prevent the expulsion of the air between the fibers of the filler. The air between the fibers of the filler increases the elasticity of the filler.

What is claimed is:

1. A tire including a shoe comprising an outer elastic section, and spaced layers of woven wire, and an elastic pith filling body arranged between the layers of woven wire.

2. A tire including an outer resilient section, spaced layers of woven wire at the interior of said section, an elastic dry water-proofed pith filling body between said layers of woven wire, and an interior dry elastic water-proofed pith filling surrounded by said layers.

3. A tire comprising an outer resilient section, a core of compressed water-proofed elastic plant pith filling material of fibrous parenchymatic structure at the interior of said tire and in spaced relation from the outer section, spaced layers of woven wire occupying the space between the core and the outer section, and a body of dry water-proofed pith filling between said layers of woven wire.

4. A tire including a shoe of the clencher type, an elastic filling body arranged within the shoe, and a locking member located between the base portions of the shoe and arranged to receive the pressure of the filler, said locking member being substantially wedge shaped in cross section and having resilient side flanges provided at intervals with tapered slots or recesses.

5. A tire including a shoe and side clamping members, a rim inclosing said side clamping members, the said members having inner and outer flanges arranged in spaced relation to resiliently receive the edges of said shoe, and extending some distance beyond the rim at the inside and outside of said shoe.

6. A tire including a shoe, and side clamping rings of pincer-like cross section and composed of arcuate sections adapted to be mounted on a rim and gripping the edges and part of the body of said shoe at the inside and outside thereof, and a rim on which said shoe and said clamping rings are mounted and surrounding the bases of said clamping rings.

7. A tire including a shoe provided at opposite sides with beads, and side clamping members designed to be mounted on a rim and provided with spaced inner and outer flanges conforming to the configuration of the beads and arranged to clamp the shoe at the sides thereof interiorly and exteriorly of the same, said flanges being yieldable.

8. A tire including a shoe provided at opposite sides with beads, side clamping members designed to be mounted on a flanged rim and provided with spaced inner and outer flanges conforming to the configuration of the beads and arranged to clamp the shoe at the sides thereof interiorly and exteriorly of the same, said flanges being yieldable, and means arranged interiorly of the tire for operation by the pressure of the tire for forcing the clamping members into engagement with the rim flanges.

9. A tire including a shoe, side clamping members designed to be mounted on a flanged rim and having inner and outer flanges arranged to engage the shoe, a locking member arranged between the said side clamping members and adapted to be operated on by internal pressure of the tire for forcing the clamping members into engagement with the rim flanges.

10. A tire including a shoe, side clamping members designed to be mounted on a flanged rim and having inner and outer flanges arranged to engage the shoe, and a substantially wedge shaped locking rim arranged between the clamping members and operated on by internal pressure of the tire for forcing the said clamping members into engagement with the rim flanges.

11. A tire including a shoe, side clamping members designed to be mounted on a flanged rim and having inner and outer flanges arranged to engage the shoe, and a substantially wedge shaped locking ring arranged between the clamping members and operated on by internal pressure of the tire for forcing the said clamping members into engagement with the rim flanges, said locking ring and clamping members having coacting inclined or angularly disposed faces provided with corrugations.

12. A tire including a shoe, side clamping rings having circumferentially arranged openings to receive the shoe, said clamping rings having converging inner side faces, and a cross sectionally tapered locking member arranged to engage the converging side faces of the clamping rings for urging the same outward to maintain the said clamping rings in interlocked relation with a rim.

In testimony whereof I affix my signature in presence of two witnesses.

JAMES H. DOUGLASS.

Witnesses:
JOHN J. STEVENS,
A. Y. STEGER.